United States Patent [19]

Rubel

[11] Patent Number: 4,819,772
[45] Date of Patent: Apr. 11, 1989

[54] MOTION-DAMPING APPARATUS FOR A VEHICLE

[75] Inventor: Erich Rubel, Ludwigsburg, Fed. Rep. of Germany

[73] Assignee: Robert Bosch GmbH, Stuttgart, Fed. Rep. of Germany

[21] Appl. No.: 178,169

[22] Filed: Apr. 6, 1988

[30] Foreign Application Priority Data

Apr. 11, 1987 [DE] Fed. Rep. of Germany ....... 3712349

[51] Int. Cl.⁴ .................. B60G 17/10; F16F 9/46
[52] U.S. Cl. .................................. 188/299; 188/267;
188/282; 188/315; 188/318; 188/322.14;
188/322.15; 188/322.5; 280/707; 280/714
[58] Field of Search ............... 188/299, 281, 282, 286,
188/287, 288, 267, 268, 318, 319, 317, 311, 314,
315, 313, 316, 322.11–322.5, 284; 267/140.1,
64.14–64.28; 280/707, 714, 708

[56] References Cited

U.S. PATENT DOCUMENTS

| | | | |
|---|---|---|---|
| 2,354,340 | 7/1944 | Utter | 188/318 X |
| 3,059,915 | 10/1962 | Kemelhor | 188/267 X |
| 3,207,270 | 9/1965 | Ellis, Jr. | 188/287 |
| 3,321,210 | 5/1967 | Delchev | 280/707 X |
| 3,605,960 | 9/1971 | Singer | 188/314 X |
| 4,031,989 | 6/1977 | Blazquez | 188/299 |
| 4,589,528 | 5/1986 | Axthammer et al. | 188/299 X |
| 4,720,087 | 1/1988 | Duclos et al. | 188/267 X |
| 4,742,998 | 5/1988 | Schubert | 188/322.5 X |

FOREIGN PATENT DOCUMENTS

| | | |
|---|---|---|
| 3443183 | 5/1986 | Fed. Rep. of Germany . |
| 2154700 | 9/1985 | United Kingdom ............... 188/299 |

Primary Examiner—Douglas C. Butler
Attorney, Agent, or Firm—Edwin E. Greigg

[57] ABSTRACT

A motion-damping apparatus is proposed which has a shock absorber disposed between a vehicle axle and a vehicle body. A piston that is supported on the vehicle body via a piston rod is movably supported in an inner jacket tube of the shock absorber. The piston divides work chambers filled with an electrorheological fluid as a damping fluid. The work chambers communicate with one another via an overflow cross section, the size of which is defined by a control slide the position of which is determined by an axially movable sheath. The sheath forms a first electrode, while the walls of an annular conduit receiving the sheath form a second electrode. The intensity of an electrostatic field that can be developed between the electrodes has an influence on the magnitude of the shear stress of the damping fluid flowing in the annular conduit and hence on the deflection of the sheath. In this way, the damping of the shock absorber can be adjusted via the electrostatic field present at the electrodes.

21 Claims, 2 Drawing Sheets

MOTION-DAMPING APPARATUS FOR A VEHICLE

BACKGROUND OF THE INVENTION

The invention is based on a motion-damping apparatus for a vehicle. An apparatus of this type has set forth in U.S. patent application Ser. No. 800,574 filed Nov. 21, 1985, now abandoned, in which the hydraulic properties of the damping fluid can be varied by applying electrical fields. An electrorheological fluid is used as the damping fluid. The damping fluid flowing back and forth between the two work chambers of the apparatus is guided past plate electrodes; this changes its hydraulic properties and in turn makes it possible to vary the damping properties of the apparatus as desired. The higher the voltage present at the electrodes, the greater the shear stress of the electrorheological fluid at the electrode surfaces becomes, and hence the greater the damping of the apparatus.

A disadvantage of the above noted apparatus is that the damping range attainable with it is quite small, and cannot properly address all the situations that arise while driving.

Moreover, if the electrodes or their electrical triggering fails, the shearing strain of the damping voltage drops to a minimal value, namely that of the normal shear stress, so that the apparatus has the least possible damping capacity. If such a defect occurs suddenly, a vehicle equipped with the above noted apparatus can be in danger, and at least will have an unfavorable chassis characteristic for emergency operation.

OBJECT AND SUMMARY OF THE INVENTION

The apparatus according to the invention has an advantage over the prior art in that an attainable damping range is wider than in conventional apparatuses, also that even in extraordinary driving situations, suitable damping values can be established. Supporting one of the electrodes slidingly makes it possible not only to vary the hydraulic property of the damping fluid but also the size of an overflow cross section. As a result, a much wider range of the damping values is possible than in the above set forth apparatus.

It is particularly advantageous to embody the apparatus such that if the electrodes or their electrical triggering fails, the maximum possible damping ensues, which is the best option for emergency operation of a vehicle.

It is also advantageous to embody the first electrode as a sheath supported coaxially in the shock absorber, making for a compact shock absorber.

It is furthermore advantageous to control the overflow cross section by means of a slide, which enables a wide variation of the overflow cross section with only a small adjusting movement.

The invention will be better understood and further objects and advantages thereof will become apparent from the ensuing detailed description of a preferred embodiment taken in conjunction with the drawings.

DESCRIPTION OF THE PREFERRED EMBODIMENT

Figure 1:
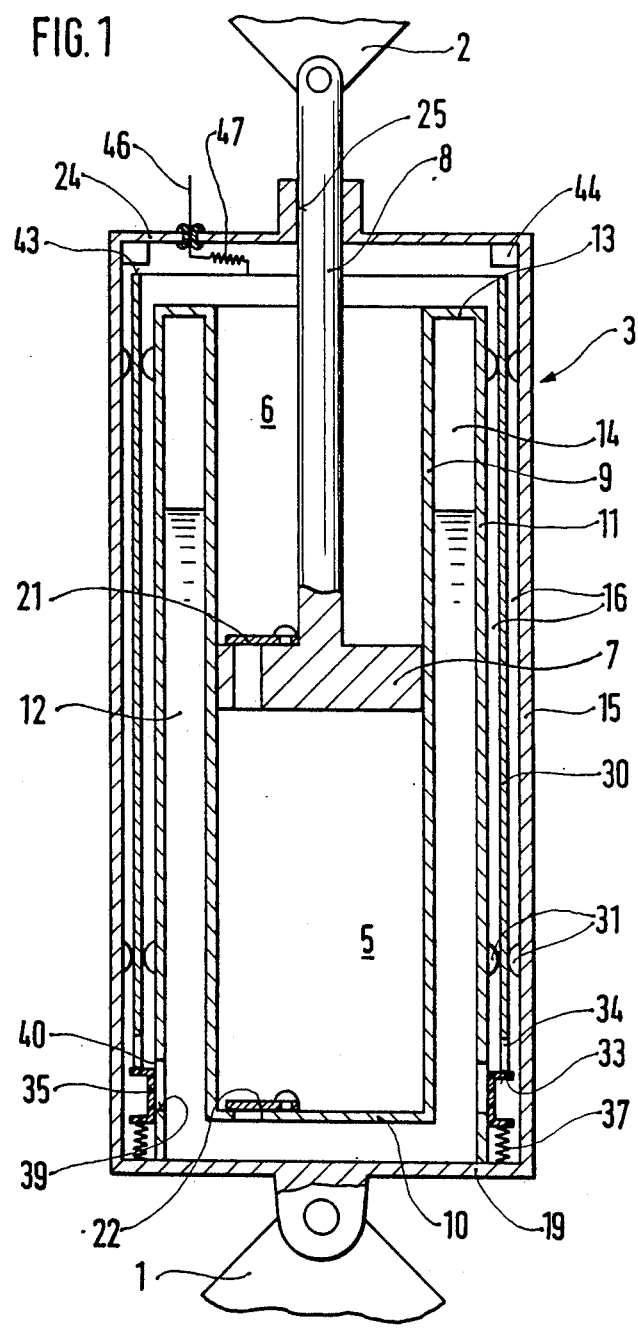
FIG. 1 is a simplified illustration of an exemplary embodiment of the invention.

FIG. 1 illustrates a shock absorber 3 disposed between a vehicle axle 1 and a vehicle body 2. Besides its vibration-damping function, the shock absorber 3 may also have a supporting function, for example as part of a hydraulic suspension, and it is the major component of the apparatus according to the invention for damping courses of motion. The shock absorber 3 has a first work chamber 5 and a second work chamber 6, which is separated from the first work chamber 5 by a movable wall embodied as a piston 7. Connected to the piston 7 is a piston rod 8 acting as an actuating rod, which penetrates the second work chamber 6 and extends out of the shock absorber 3 in a sealed manner, being supported on the vehicle body 2. If it is additionally used as a supporting element, the load-bearing capacity of the arrangement is due to the static pressure in the work chambers 5 and 6 and to the surface area of the piston rod 8. The piston 7 slides axially in an inner jacket tube 9, which is closed off at one face end, which includes the work chamber 5, by a bottom wall 10. The inner jacket tube 9 is axially surrounded by a cylindrical intermediate wall 11. An annular compensation chamber 12 is located between the inner jacket tube 9 and the intermediate wall 11 and is closed off toward the vehicle body 2 by an end wall 13. The compensation chamber 12 is filled with damping fluid only partway up its height and the fluid is also contained in the spacing between the bottom wall 10 and the bottom of the cylinder 3. The remaining space oriented toward the vehicle body 2 is filled with a gas 14 which serves to compensate for the volume of the portion of the piston rod 8 that is located in the chamber.

An outer jacket tube 15 surrounds the intermediate wall 11 and the inner jacket tube 9, and between the intermediate wall 11 and the outer jacket tube 15 an annular conduit 16 is formed, which at one end communicates with the second work chamber 6 and on the other is closed off by an end plate 19, on which the face end of the intermediate wall 11 also rests.

The shock absorber 3 has one-way check valves, of which a first one-way check valve 21 is located on the top of the piston 7, while a second one-way check valve 22 closes the bottom 10 of the inner jacket tube 9. The first check valve 21 allows a flow through it from chamber 5 only in the direction toward the second work chamber 6, while the second check valve 22 allows a flow through it only in the direction from the compensation chamber 12 into the first work chamber 5. Correspondingly, when the piston rod 8 is retracted from the tube 9, the second check valve 22 opens, while when the piston rod 8 is pushed into the tube 9, the first check valve 21 opens. The size of the flow cross sections of the check valves 21 and 22 determines the basic damping of the shock absorber 3. Toward the vehicle body 2, the shock absorber 3 is closed off by a further end plate 24, which sealingly guides the piston rod 8 in a central bore 25 and with its outer diameter is flush with the outer jacket tube 15.

A sheath 30 is disposed in the annular conduit 16 between the intermediate wall 11 and the outer jacket tube 15, which acts as a control chamber, and is radially spaced apart from the outer jacket tube 15 and intermediate wall 11 as equally as possible. Slide elements 31, secured to the inner wall 11 and outer jacket tube 15, are located between the sheath 30 and the intermediate wall 11 on the one hand and the outer jacket tube 15 on the other and which guide the sheath 30 in the direction of axial motion. The slide elements 31 are made from an electrically insulating material. A control slide 35 rests on a first face end 33 of the sheath 30, oriented toward the vehicle axle 1, in which a plurality of radially extending flow openings 34 are machined, and on its other end the control slide 35 is loaded with the force of at least one spring 37 that rests on the end plate 19. The control slide 35 takes the form of a short cylindrical tube or ring and can slide axially with its inner jacket face along the outer jacket face of the intermediate wall 11. In this process, a variably large portion of an opening 39 in the intermediate wall 11 is covered, depending on the axial location of the control slide 35. The portion that is not covered forms an overflow cross section 40, which connects the annular conduit 16 with the compensation chamber 12 for fluid flow through the second check valve 22, with the first work chamber 5. The control slide 35 is made from an electrically insulating material and in its form as shown is in a state of static pressure equilibrium. Oriented toward the vehicle body 2 is a second end face 43 of the sheath 30 oriented toward the vehicle body 2; in any axial position of the sheath 30, a flow conduit remains between the second end face 43 of the sheath 30 and the further end plate 24 closing off the outer jacket tube 15.

The axial motion of the sheath 30 in the direction toward the vehicle body 2 is limited by stops 44. The geometry of the sheath 30, control slide 35, openings 39 and stops 44 relative to one another is dimensioned such that when the sheath 30 rests with its second face end 43 on the stops 44, the overflow cross section 40 through the wall 11 is of minimum size. The farther the sheath 30 is moved toward the vehicle axle 1, the larger the overflow cross section 40 becomes. The axial position of the sheath 30 accordingly determines the size of the overflow cross section and hence the magnitude of the damping of the shock absorber 3.

The position of the sheath 30 inside the shock absorber 3 depends on the force which the damping fluid, flowing along the sheath 30 inside the annular conduit 16 in the direction of the control slide, exerts upon the cylindrical walls of the sheath 30 as a result of the shear stress on the wall. It is the shear stress in the boundary layer of the damping fluid flowing past the sheath 30 that is responsible for this force exerted by the damping fluid on the walls of the sheath 30. The principle of physics on which the invention is based is that the shear stress of the electrorheological fluid used as the damping fluid can be varied by applying an electrostatic field to the electrorheological fluid. Electrorheolocical fluids of this kind are, typically, suspensions of small particles in oil. The field intensities of the electrostatic fields required are on the order of a few kilovolts per millimeter, for example 2 to 4 kV/mm.

The electrostatic field that varies the shear stress of the electrorheological fluid must be formed between at least two electrodes of dissimilar polarity. In the present exemplary embodiment, the sheath 30 serves as a first electrode, which is connected via an electrical connection 46 with a voltage source, not shown, or a control unit (FIG. 1). A length compensation means 47 in the electric supply line assures the electrical contact between the sheath 30 and the electrical connection 46 in any axial position of the sheath 30.

As the second electrode, either the intermediate wall 11 or the inner wall of the outer jacket tube 15 is used, or else, as shown in the drawing, both are used. If the second electrode is embodied as a ground electrode, an additional electric connection for this purpose is unnecessary.

Figure 2:
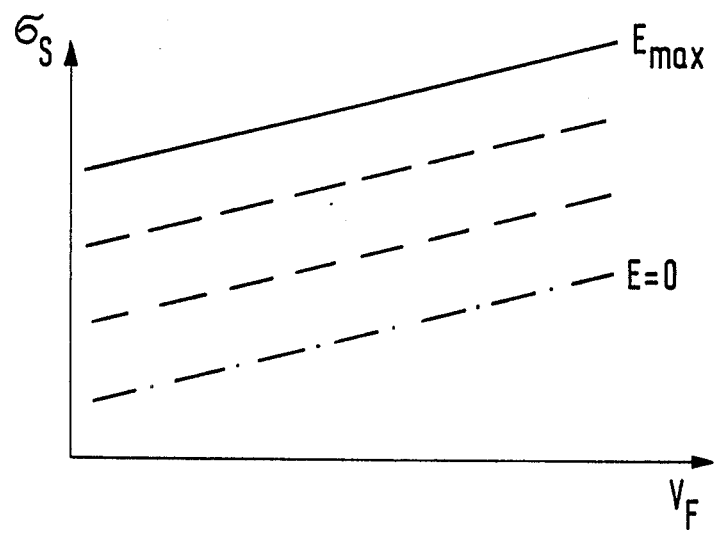
FIG. 2 is a diagram of the course of the shear stress of the damping fluid at the electrode surfaces, plotted over the flow velocity of the damping fluid at various electrode voltages.

In FIG. 2, the course of the shear stress is plotted over the flow velocity $F_V$ of the electrorheological fluid inside the annular conduit 16, for various electrical field intensities E. As the drawing shows, the shear stress increases only slightly with the flow velocity $V_F$, but increases greatly with the electrical field intensity E applied. In the present invention, this physical property of the electrorheological fluid makes it possible, with a suitable magnitude of the electrostatic field acting upon the damping fluid, to define the shear stress at the sheath 30, and with it the axial deflection of the sheath 30 counter to the force of the spring 37, and hence the size of the overflow cross section 40 that determines the damping. The force upon the control slide 30, determining the size of the cross section, is thus the resultant of the force upon the sheath 30 engaging the control slide 35, on the one hand, and the counteracting force of the spring 37 (gravity and inertia are disregarded in this calculation).

Figure 3:
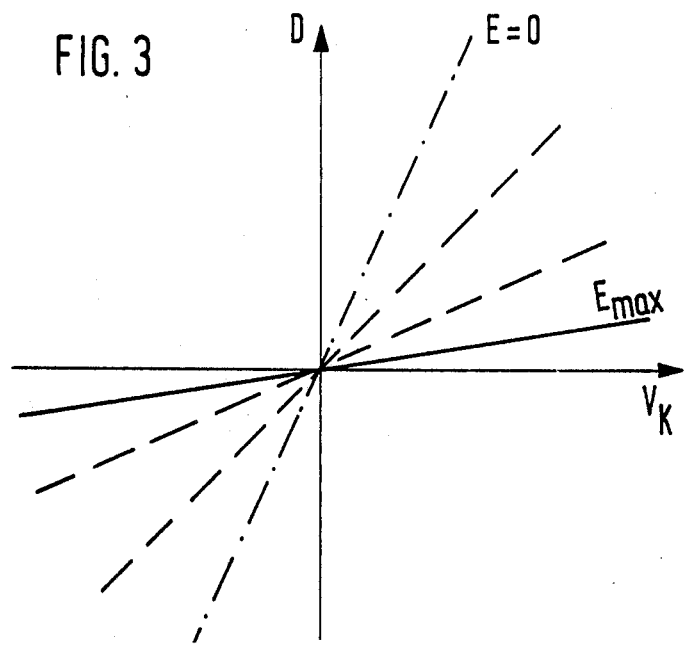
FIG. 3 is a diagram of the course of the damping of the apparatus, plotted over the piston speed for various electrode voltages.

In FIG. 3, the course of the damping D is plotted over the speed $V_K$ of the piston 7 for various field intensities E. The most forceful damping occurs with the electrodes shut off (E=0); the least forceful damping D occurs when the electrostatic field is at full intensity ($E_{max}$). In the event of failure of the electrical triggering of the electrodes, the apparatus will function as indicated by the dot-dash line (E=0), or in other words with the maximum possible damping. This is the best option for emergency operation, because a high degree of driving safety remains, with a sacrifice in ride comfort.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An adjustable motion-damping apparatus for vehicles, comprising an outer tubular jacket (15), an inner tubular jacket having an open end and a closed end within said outer tubular jacket in coaxial alignment therewith, a piston in said inner jacket which divides said inner tubular jacket into first and second work chambers for receiving an electrorheological damping fluid, a piston rod secured to said piston, said piston rod extending from said inner tubular jacket through said outer tubular jacket, a control chamber surrounding said inner tubular jacket for receiving said damping fluid, said control chamber including two plate electrodes to which an electrical source is connected to generate an electrostatic field to adjust the damping, said first electrode (30) being axially displaceably disposed in a damping fluid flow direction, a control slide device (35) connected to said first electrode, said control slide device is adapted to control the size of an overflow cross section of at least one opening (40) in said control chamber which controls the damping fluid, and said work chambers communicating with one another via said overflow cross section, the size of which is defined by said control slide device, the position of which is determined by said axially movable first electrode, the intensity of the electrostatic field developed between the electrodes influencing the magnitude of the shear stress of the electrorheological damping fluid flowing in said control chamber and hence deflection of said first electrode.

2. An apparatus as defined by claim 1, in which a spring (37) is provided in said control chamber which cooperates with said control device, and said control device (35) is acted upon by the force of said first electrode (30) and by a counteractive force of said spring (37).

3. An apparatus as defined by claim 1, in which said first electrode (30) comprises a sheath disposed coaxially with said piston (7), said sheath being disposed in said control chamber (16) axially surrounding said piston (7), said control chamber having the form of an annular conduit (16) and at least one wall (11, 15) of said control chamber forming said second electrode.

4. An apparatus as defined by claim 3, in which said control device (35) is disposed on one face end of said sheath.

5. An apparatus as defined by claim 4, in which said control device (35) comprises a control slide.

6. An apparatus as defined by claim 1, in which the size of the overflow cross section (40) is minimal whenever no electrical voltage is present at the electrodes (30, 11, 15).

7. An apparatus as defined by claim 1, further including a compensation chamber, said compensation chamber provided with an electrorheological fluid and a gaseous fluid.

8. An apparatus as defined by claim 1, in which said closed end of said inner tubular jacket includes a one-way valve to admit fluid into said first chamber of said inner tubular jacket.

9. An apparatus as defined by claim 7, in which said closed end of said inner tubular jacket includes a one-way valve to admit fluid into said first chamber of said inner tubular jacket.

10. An apparatus as defined by claim 8, in which said piston includes a one-way valve for fluid flow from said first chamber to said second chamber.

11. An apparatus as defined by claim 9, in which said piston includes a one-way valve for fluid flow from said first chamber to said second chamber.

12. An apparatus as set forth in claim 3, in which each of said walls of said control chamber form second electrodes.

13. An apparatus as set forth in claim 3, in which electrically non-conductive guide means are disposed on opposite sides of said sheath.

14. An apparatus as set forth in claim 8, in which electrically non-conductive guide means are disposed on opposite sides of said sheath.

15. An apparatus as set forth in claim 9, in which electrically non-conductive guide means are disposed on opposite sides of said sheath.

16. An apparatus as set forth in claim 3, in which said control chamber includes a stop means for limiting movement of said sheath in an axial direction.

17. An adjustable motion-damping apparatus for vehicles, which comprises an outer tubular jacket (15) closed at each end, an inner tubular jacket (9) closed at one end, an intermediate wall (11) between said outer tubular jacket and said inner tubular jacket, a fluid compensation chamber (12) defined by said inner tubular jacket and said intermediate wall and a bottom of said outer tubular jacket, at least one opening (40) in said intermediate wall through which fluid flows to said compensation chamber (12), a piston secured to a piston rod dividing said tubular jacket (9) into first and second work chambers, an electrorheological damping fluid which fills said first and second working chambers, a control chamber formed by said outer tubular jacket and said intermediate wall, first and second electrodes that generate an electrostatic field to adjust the damping, said first electrode (30) being axially displaceably disposed in a damping fluid flow direction, a control slide device (35) connected to said first electrode, said control slide device controls the size of an overflow cross section of said at least one opening (40) in said intermediate wall for the damping fluid, and said work chambers communicating with one another via said overflow cross section, the size of which is defined by said control slide device, the position of which is determined by said axially movable first electrode, the intensity of the electrostatic field developed between the electrodes influencing the magnitude of the shear stress of the electrorheological damping fluid flowing in said control chamber and hence deflection of said first electrode.

18. An apparatus as defined by claim 17, in which a spring (37) is disposed in said control chamber which cooperates with said control device, said control device (35) is acted upon by the force of said first electrode (30) and by a counteractive force of said spring (37).

19. An apparatus as defined by claim 18, in which said first electrode (30) comprises as a sheath disposed coaxially with said piston (7), said sheath being located in said control chamber (16) axially surrounding said piston (7), said control chamber having the form of an annular conduit (16) and at least one wall (11, 15) of said control chamber forming said second electrode.

20. An apparatus as defined by claim 19, in which said closed end of said inner tubular jacket includes a one-way valve to admit fluid into said first chamber of said inner tubular jacket.

21. An apparatus as defined by claim 19, in which said piston includes a one-way valve for fluid flow from said first chamber to said second chamber.

* * * * *